A. T. SAUNDERS.
METHOD OF PRODUCING COLORED MOTION PICTURE FILMS.
APPLICATION FILED SEPT. 10, 1919.

1,366,954.

Patented Feb. 1, 1921.
2 SHEETS—SHEET 1.

INVENTOR.

Addison T. Saunders

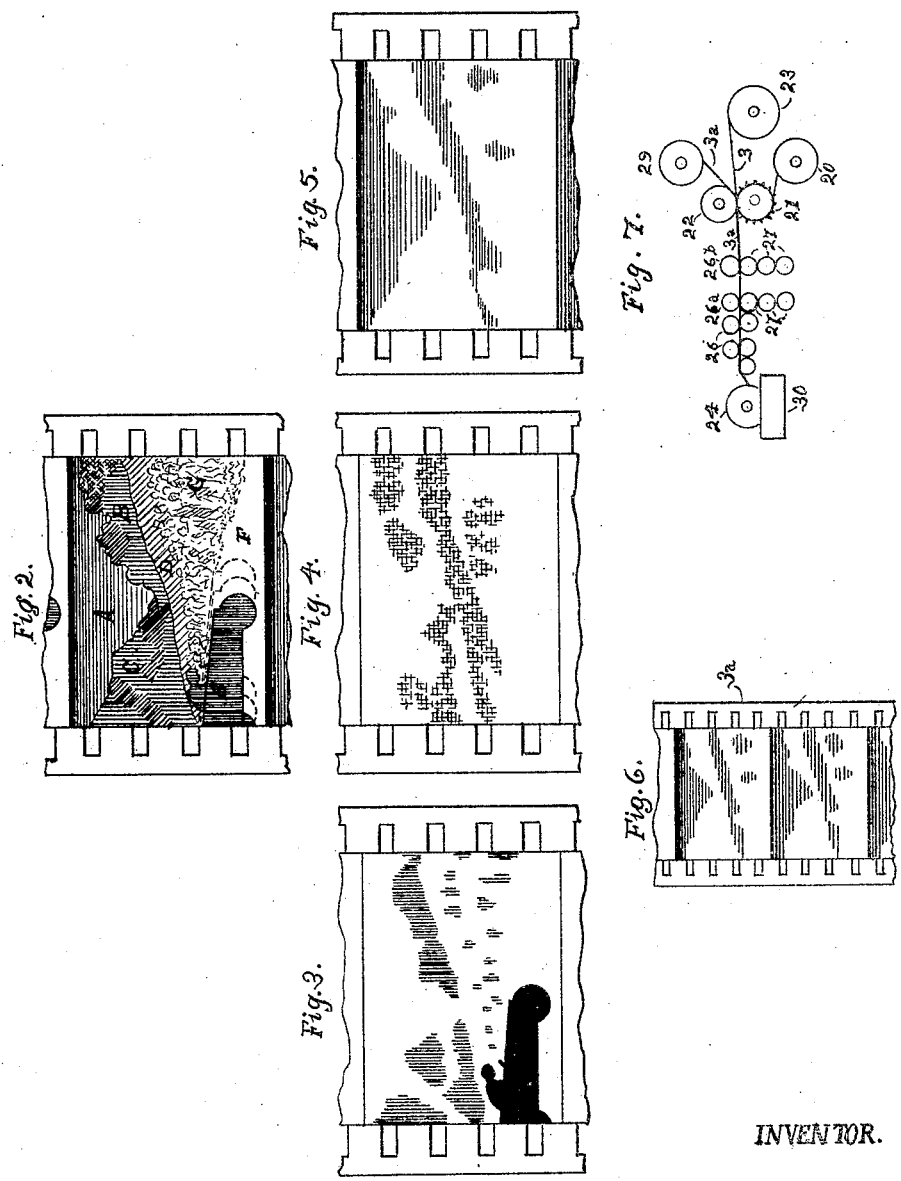

UNITED STATES PATENT OFFICE.

ADDISON T. SAUNDERS, OF CHICOPEE, MASSACHUSETTS.

METHOD OF PRODUCING COLORED MOTION-PICTURE FILMS.

1,366,954. Specification of Letters Patent. Patented Feb. 1, 1921.

Application filed September 10, 1919. Serial No. 323,000.

*To all whom it may concern:*

Be it known that I, ADDISON T. SAUNDERS, of Chicopee, in the county of Hampden and State of Massachusetts, have invented certain new and useful Improvements in Methods of Producing Colored Motion-Picture Films, of which the following is a specification.

My invention relates to the art of producing motion pictures in colors. More particularly, it provides a new method of producing colored motion picture films.

This application is designed to cover the matter excluded, as disclosing a separate invention, from the other matter forming the subject of my application, under a similar title, Serial No. 178,301, and certain new matter, as will appear.

A principal object of my invention is to provide means whereby colored films may be produced in multiple and at a cost which renders their general use practicable.

Further objects of this invention will be apparent from this description.

In the former invention referred to above I project upon a suitable surface enlarged images of the individual views of a film, either negative or positive, and by the guidance of these images I execute photographable representations of the desired component colors for this film, and from these representations, by the employment of known photo-color methods, prepare selective printing strips from which I print these colors upon the monochromatic films.

In this present invention I project, in a similar way, enlarged images of the views of a film, but upon a photo-sensitive surface, making a series of enlarged photographs of individual views, color these enlarged photographs as desired and from these enlarged and colored photographs make, by known methods and by steps shown herein and in my former invention, colored films.

It will be seen that my methods differ radically from all those which depend upon making photographs in natural colors direct from nature or upon color-selective negatives so made.

Color effects have been produced in motion pictures by hand-tinting the film, by the employment of color-shutters, blending the colors upon the screen by the persistency of vision, by stenciling or blocking out in combination with color media, etc., but prior to my inventions no means have been provided which made it possible to produce colored films in multiple and at a cost which rendered practicable their general use; nor has there been discovered prior thereto any method which would enable the exact placing by hand of colors relative to the minute forms of picture films.

These desiderata are objects of and are supplied by my invention.

The manner in which I prefer to carry out my invention will be better understood by reference to the accompanying drawings, partly diagrammatic, and in which—

Fig. 2 represents a picture unit or individual view from a series of photo-enlargements from a motion picture film or negative colored in accordance with my methods, with certain dotted lines which will be explained below.

Figs. 3, 4 and 5 illustrate various component color representations from the same view in a motion picture film as that shown in Fig. 2.

Fig. 6 shows a portion of a continuous color-printing strip for one of the component colors for the same film.

Fig. 7 shows the arrangement of parts in a device for printing the component colors upon a motion picture film or foundation for same, according to this invention.

Figure 1:
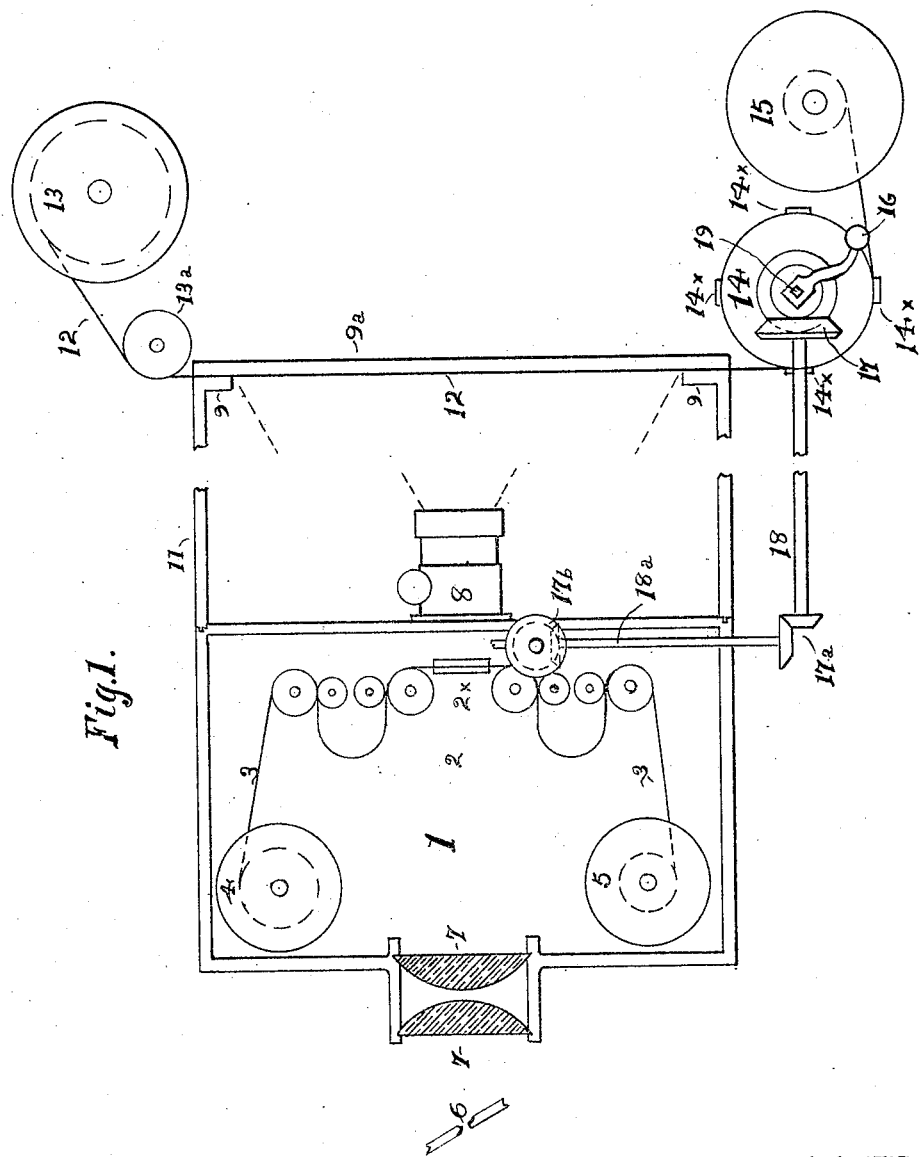
Figure 1 shows in broken view a combined projector and enlarging camera with a motion picture negative film and a roll of photo-sensitive paper for a series of enlarged photographs in position for use.

It is impossible short of color plates, to properly show the actual distribution of the component colors in their various degrees of depth and gradations as they would appear for the selective color plates in reproducing the colored enlarged photographs by the three-color or similar process as a color film, and it is therefore not attempted. For certain classes of subjects the employment of the monochromatic picture film from which the photo-enlargements are made, or of a fac-simile thereof, as a foundation or monochromatic base upon which to print in colors from the various color printing elements, to form a film in colors, may be omitted and these various color printings be made instead upon a blank film. It will be understood that in these cases the several color printings form in combination a complete picture film of the subject, in colors, analogously to the way in which a complete colored picture is formed by color printings without a monochromatic base, or printing in monochrome, as a foundation, in the usual three-color process.

The difficulty stated above of properly showing by drawings the component colors in their various gradations applies equally to the showing of a monochrome base. Fig. 2 of the drawings is therefore designed to represent a unit of a film in colors made by this method, whether a monochromatic image form a part or base of the picture or not.

The preferred manner of carrying my invention into effect is as follows:—

The film negative 3, of a subject to be produced in color, carried upon the reel 4, (Fig. 1) is threaded into the motion head 2, and onto the reel 5, by the usual blank lead, and focused upon the backboard 9ª, being illuminated by actinic light from the source 6 passing through the condensers 7 7 and projected by the objective 8, the first view being framed in the aperture 2ˣ. The light is cut off and a continuous roll of photo-sensitive paper 12, preferably of the bromo-gelatin, development type, carried upon the reel 13, is roved between the frame 9, and the backing board 9ª, over the sprocket roll 14, and onto the reel 15. The roll 12 has marginal slots as shown in Figs. 2, 3, etc., corresponding with the slots in a motion picture film, and these are engaged by the sprockets 14ˣ 14ˣ, etc., of the roller 14. Through these means, by the operation of the crank 16, I advance the roll 12 sufficiently to permit of taking a turn of the end of the latter around 15, or of otherwise attaching it thereto. By means of a clutch, not shown, mounted in the line of shafting 18, I may then connect the beveled gears 17, through said shafting with the gears 17ª, driving the shaft 18ª, which in turn operates the motion head 2, through the gears 17ᵇ and a like pair above the same, not shown. The entire mechanism may be power-driven and a shutter so controlled may be added to admit light for the successive exposures as required.

With this device I next proceed to make an enlarged series of photographs from the film negative 3, upon the photo-sensitive roll 12, projecting the individual views successively upon the sensitive roll and advancing the film negative and the roll after each printing or exposure, the former to a successive view and the latter correspondingly, to bring an unexposed portion thereof within the frame 9, and by later treating the roll, as by developing, (toning,) fixing and washing in the usual way.

I may make but one, or three or more, series of these enlarged photographs from the negative of the subject from which I wish to produce a film in colors, depending upon which of a number of variations in certain steps of my method I regard as best suited to the subject. For certain subjects I find it desirable to employ only a single series, carefully coloring the enlarged individual views and from these making a set of color selective negatives for the component colors to the size of the usual motion picture film and, omitting the monochromatic film picture as a base, printing upon a plain film foundation, such as the usual celluloid base, in register from printing strips made to a uniform size (and adapted to be so printed) by the collotype or other and kindred photocolor process. For another class of subjects I prefer to make a number of series of enlarged photographs equal to the number of color inks which I wish to employ in coloring the film. To illustrate:—

Assuming that the film to be colored has the scene shown in Fig. 2 as its first view and that the desired color scheme is as follows: The sky A, blue; the foliage B, as an autumn wood, yellow, red and green; the hill C, to have patches of green and red of somewhat less strength than the full colors in order to give, in combination with the monochromatic film, shades of greenish and reddish brown; the upland D, green; the motor car E, together with the driver, red; all as indicated by symbolic shading in Fig. 2; the roadway F, to be left in the color of the monochromatic film; and a variety of colors and tints not indicated in the figure for the crowd of people G, assuming also that I propose to limit the color printings to three, similar to the usual three-color printing, and that the color representation for the red is to be the first made, I first make three series of the enlarged photographs and upon one of these, with a pigment or pigments adapted to render all gradations, from light to deep shades, such for instance as carbon black, and Chinese white in combination therewith, I proceed to lay in patches, masses, lines and dots of the depth of tint or color (red) desired for the various portions of the picture into the coloring of which any red enters, keeping to the forms and limits of such portions, as roughly indicated in Fig. 3. The motor car and driver being in the foreground, and principal objects, I want in full red. I therefore lay these in in solid black. The hill C, I touch in patches light and darker and in like manner treat the autumn woods. Certain predetermined portions of the faces and costumes of crowd G, are touched somewhat as indicated and all portions of the photograph not corresponding with parts of the picture in which it is desired red should appear are now either painted out in white or bleached with a bleaching agent.

I next proceed to execute upon the two remaining series of the enlarged photographs color representations for the remaining component colors, say, yellow and blue—using one series, of course, for each of these. For the yellow the representation will, for the view shown in Fig. 2, consist, as indicated in Fig. 4, of patches of various depths or shades of the photographable monochrome pigments, as desired, for the yellow portion of the autumn wood B, the greens of the brown hill C, a strip, of comparatively deep tone for the yellow component of the green stretch of rising ground D, and patches as desired for portions of the crowd G.

The color representation for the blue is executed in like manner. This representation as related to the view Fig. 2, is indicated in Fig. 5; for the sky A, a broad wash of deep color growing lighter toward the horizon; a strip of blue for the green of the rising ground D, and patches as desired for the mixed colors of the crowd G.

I next make a film negative of each of these color representations to the scale of the original film and adapted to register therewith throughout. This is best done by employing as a copying camera such a device as that shown for making the color representation photographs; Fig. 1. The rolls bearing these representations are each traveled through the frame 9, and halted with each successive unit in the position in which that individual exposure was made, while an exposure is made of a corresponding section of a blank (or "raw stock") photosensitive film traveled through the motion head 2, with corresponding halts in the aperture 2. If the device Fig. 1 be used light is excluded from the condensing lenses 7, 7, and the section of the color representation roll within the frame 9, is illuminated with actinic light, as by arc lamps, or daylight admitted by removing the hood 11. For this operation the paper rolls having the color representations are carried upon rollers as in their first travel through the frame 9, and the negative film is carried upon the reels 4 and 5, as the original film or negative was carried. When all the color representations have been photographed the three negative films are developd in the usual way. From each of these negatives I now make a color-printing strip 3ª, illustrated in Fig. 6, preferably by the well known collotype process. These printing strips consist of a continuous succession of printing units analogous to color-printing blocks but having a flexible support. These strips have marginal slots, or perforations, as shown in Fig. 6, to enable their being run in register with the picture film to be colored.

In the cases where I make but a single series of colored photo-enlargements, as above referred to, this single series is given the full coloring as desired for the final picture films and from this I make, by the employment of the usual color filters, and selective color methods, separate component-color negatives, one for each color to be printed, and from these, color-printing strips such as described above. In either case the actual coloring of the final films is done in the same way, as described later.

In making these printing strips from the series color negatives it is desirable because of the low degree of sensitiveness of the chromatized gelatin film, to print long lengths of the printing strip at one exposure. My preferred method of doing this is described in the companion application referred to above. Whether the printing be so done or a single view at a time, the procedure, when the collotype process is used, is essentially the same—the negative and sensitized gelatin surface are held in contact and actinic light permitted to pass through the former for the required time and the gelatin surface then prepared for printing in the usual way.

Having made a color-printing strip for each of the component colors for the subject to be produced in color, preferably by the process named above, the coloring of the motion picture film is done by printing from these printing strips in succession upon the picture film, employing the suitable color of ink for each and maintaining, throughout, the register or proper relative positions of printing strip and film.

In the application referred to above I point out that to secure the most brilliant color effects in costume, characters may be dressed in colors which photograph light, in order that there may be no opacity of the film to dull the printed colors. This principle may be carried into the backgrounds or scenery, as well, by selecting scenes which photograph light, when natural scenery is employed, and by proper painting of artificial backgrounds, or interiors, when such are used.

When for a number of individual views, or successive units, in a picture film, there is no apparent motion, or when the motion is confined to a limited part of the picture—as, for instance, in the subject shown in Fig. 2, where, for illustration, we will suppose that during the time of the passage of the motor car across the scene all other objects in the picture are practically without motion—I may make an exception to the practice of making complete color representations or enlarged colored photographs for each unit of the film. In such cases as this I may hold the roll of photographic paper to one position and make but one exposure for the number of so similar individual views—this procedure to be paralleled when making the negatives from these enlarged photographs for the colors, by exposing successively a sufficient number of individual lengths of the reduced size negative film to the projection of the one enlarged, colored photograph to tally with the units represented by the one enlarged photograph. For these units the motor car and driver may be obliterated—painted out—from the large photograph and a color cut-out of these substituted, to be advanced for each successive unit by a short step, as indicated in Fig. 2, by dotted lines.

Separate enlarged photographs may be employed, instead of the series upon a roll of paper, but in so doing they must be accurately placed in identical relation to the film when they are made and when copied after coloring.

It is within the purview of my invention, to make from the colored photographs or color-representations separate color-printing elements, instead of the continuous series or printing strip, and to print in colors on the film or film foundation from these. This is less desirable but it should be understood that the term "printing element" employed in my claims covers both the continuous printing strip and separate or shorter printing pieces representing sections of a film.

It is obvious that instead of executing the color representations or the full coloring of the enlarged photographs directly upon the same this may be done upon a transparent material superposed thereon, and that the copying for the color-selection step may be done with this material bearing the color or color representations still in place upon the enlarged photographs or removed therefrom. It is to be understood that such employment of a superposed material is within the purview of my invention and is covered by my terms, in this specification and in the claims, "coloring said photographs," "executing by the guidance of,"—etc., and the like.

It is also obvious that my invention is applicable to the paper photograph series and the opaque supports and the like used in the portable and "penny-in-the-slot" motion picture devices as well as to the usual projection machines employing transparent film, and the claims are designed to cover such application.

Wherever I use the terms "film" or "picture film" as being employed for guidance in making the color representations, or in making the enlarged photographs, I design to cover either a negative or positive film, as either may be made to serve.

Having made a color-printing element, or "strip," for each of the component colors for the colored film to be produced, preferably by the process named above, the printing of the same is done in succession upon the picture film, employing the suitable color inks for each and maintaining throughout, the register or proper relative positions of printing elements and film. The operative parts of a device for this printing are diagramed in Fig. 7. The film 3, to be colored or printed is carried upon the reel 20. It is threaded by its marginal slots over the sprocket 21, under the pressure roller 22, and onto the barrel 23. As the film is printed it is wound spirally upon the barrel 23, or, optionally, it may be carried through a drying cabinet and onto a like device for printing in a second color, and so on till all the printings are done. Care is taken that when the film is threaded upon the sprocketed roll by its blank lead it shall be so positioned that its first unit shall register with the first unit of the color printing strip 3$^a$, which is carried upon the reel 24, is threaded between the upper and lower of the system of blotter rolls 26, between the pressure rolls 26$^a$ and 26$^b$ and their opposing ink rolls (the upper ones of the system 27), and in contact with the film 3, upon the sprocketed roller 21, thence to and upon the roller 29. Optionally, the printing strip 3$^a$, may be joined at its ends into a belt and be carried continuously over 29, 24 and through the device as shown, printing successive films run through with it.

In preparing the color representations on the enlarged photographs as a base and guide, it is sometimes desirable to retain certain portions of the photographic image for one or more of the colors instead of executing all portions by hand.

It will be understood that my novel method of enabling accuracy in the placing of the colors for picture films by hand, comprising making a series of enlarged photographs of a film, coloring them and then reducing to the required scale applies where a color film is made from these enlarged colored photographs by any color selection or photo-color process; claims are therefore drawn to cover accordingly.

I claim:—

1. The method of producing colored motion picture films comprising making enlarged photographs of the views of a film, coloring said photographs, making from said colored photographs printing elements adapted to register with said film, and printing upon said film, or a fac-simile thereof, from said printing elements in colors.

2. The method of producing colored motion picture films comprising making enlarged photographs of the views of a film, coloring said photographs, making from said photographs a set of color-selection negatives, making from said negatives color printing elements adapted to register with said film, and printing upon said film, or a fac-simile thereof, from said printing elements in colors.

3. The method of producing colored motion picture films comprising making a monochromatic motion picture film, making therefrom, or from the negative of said film, enlarged photographs of the views of said film, coloring said photographs, making from said colored photographs printing elements adapted to register with said film, and printing upon said film, or a fac-simile thereof, from said printing elements in colors.

4. The method of producing colored motion picture films comprising making enlarged photographs of the views of a film, executing by the guidance of said photographs representations of the desired distribution of colors for said film, making from said color representations printing elements adapted to register with said film, and printing upon said film, or a fac-simile thereof, from said printing elements in colors.

5. The method of producing colored motion picture films comprising making a monochromatic motion picture film, making from said film, or its negative, enlarged photographs of the views of said film, executing by the guidance of said photographs representations of the desired distribution of colors for said film, making from said color representations printing elements adapted to register with said film, and printing upon said film, or a fac-simile thereof, from said printing elements in colors.

6. The method of producing colored motion pictures comprising making enlarged photographs of the views of a film, coloring said photographs, making from said colored photographs printing elements and printing therefrom upon a suitable support a series of pictures in colors adapted to produce the visual effect of a motion picture when employed in a suitable device.

7. The method of producing colored motion pictures comprising making enlarged photographs of the views of a film, executing by the guidance of said photographs representations of the desired distribution of colors for said film, making from said color representations printing elements and printing therefrom upon a suitable support a series of pictures in colors adapted to produce the visual effect of a motion picture when employed in a suitable device.

In testimony whereof I have affixed my signature.

ADDISON T. SAUNDERS.